(12) United States Patent
Tabuchi et al.

(10) Patent No.: US 10,752,816 B2
(45) Date of Patent: Aug. 25, 2020

(54) REACTION-CURABLE ADHESIVE, ADHESIVE KIT, AND METHOD OF USING REACTION-CURABLE ADHESIVE

(71) Applicant: Nitto Shinko Corporation, Sakai-shi, Fukui (JP)

(72) Inventors: Akihiro Tabuchi, Sakai (JP); Tatsuya Inagaki, Sakai (JP)

(73) Assignee: NITTO SHINKO CORPORATION, Sakai-shi (JP)

( * ) Notice: Subject to any disclaimer, the term of this patent is extended or adjusted under 35 U.S.C. 154(b) by 53 days.

(21) Appl. No.: 15/877,791

(22) Filed: Jan. 23, 2018

(65) Prior Publication Data

US 2018/0208810 A1    Jul. 26, 2018

(30) Foreign Application Priority Data

Jan. 25, 2017 (JP) .................................. 2017-011254
Nov. 29, 2017 (JP) .................................. 2017-229085

(51) Int. Cl.
| | |
|---|---|
| C09J 163/00 | (2006.01) |
| C09J 5/00 | (2006.01) |
| C08G 59/24 | (2006.01) |
| C08G 59/56 | (2006.01) |
| C08G 59/50 | (2006.01) |
| C09J 11/04 | (2006.01) |
| C08G 59/02 | (2006.01) |

(52) U.S. Cl.
CPC ............ *C09J 163/00* (2013.01); *C08G 59/02* (2013.01); *C08G 59/245* (2013.01); *C08G 59/504* (2013.01); *C08G 59/56* (2013.01); *C09J 5/00* (2013.01); *C09J 11/04* (2013.01); *C09J 2400/10* (2013.01); *C09J 2409/00* (2013.01); *C09J 2463/00* (2013.01); *C09J 2471/00* (2013.01); *C09J 2479/02* (2013.01)

(58) Field of Classification Search
None
See application file for complete search history.

(56) References Cited

U.S. PATENT DOCUMENTS

| | | | | |
|---|---|---|---|---|
| 3,316,188 | A * | 4/1967 | Richter | C08J 9/0066 521/116 |
| 4,130,546 | A * | 12/1978 | Goto | C08G 18/003 525/111 |
| 4,138,449 | A * | 2/1979 | Baldwin | C08F 279/02 523/176 |
| 5,001,193 | A | 3/1991 | Golden | |
| 5,248,742 | A | 9/1993 | McGarry et al. | |
| 5,629,380 | A | 5/1997 | Baldwin et al. | |
| 5,783,644 | A * | 7/1998 | Ando | C08L 63/00 525/504 |
| 5,929,141 | A | 7/1999 | Lau et al. | |
| 2004/0234774 | A1* | 11/2004 | Cheng | C09J 163/00 428/415 |
| 2009/0048370 | A1* | 2/2009 | Lutz | C08L 63/00 523/428 |
| 2011/0313082 | A1 | 12/2011 | Popp | |
| 2014/0179830 | A1* | 6/2014 | Burckhardt | C08L 101/00 523/425 |

FOREIGN PATENT DOCUMENTS

| | | |
|---|---|---|
| EP | 0375874 A2 | 7/1990 |
| EP | 2223966 A1 | 9/2010 |
| JP | 2010-127426 A | 6/2010 |

OTHER PUBLICATIONS

Sigma Aldrich entry for Bisphenol F diglycidyl ether (no date). (Year: 0000).*
Extended European Search Report dated Apr. 24, 2018, issued in counterpart European Application No. 18153065.0. (6 pages).
Office Action dated Mar. 28, 2019, issued in counterpart EP Application No. 18153065.0. (6 pages).

* cited by examiner

*Primary Examiner* — David J Buttner
(74) *Attorney, Agent, or Firm* — Westerman, Hattori, Daniels & Adrian, LLP

(57) ABSTRACT

Provided is a reaction-curable adhesive that exhibits an excellent adhesive strength even under a low-temperature environment. The reaction-curable adhesive includes an epoxy compound and an amine compound, the reaction-curable adhesive being cured through a reaction between the epoxy compound and the amine compound, in which a compound having a specific molecular structure is used as at least one of the epoxy compound or the amine compound.

5 Claims, 1 Drawing Sheet

REACTION-CURABLE ADHESIVE, ADHESIVE KIT, AND METHOD OF USING REACTION-CURABLE ADHESIVE

CROSS-REFERENCE TO RELATED APPLICATION

This application claims priority to Japanese Patent Application Nos. 2017-011254 and 2017-229085, the disclosure of which is incorporated herein by reference in its entirety.

BACKGROUND OF THE INVENTION

1. Field of the Invention

The present invention relates to a reaction-curable adhesive, and more specifically, to a reaction-curable adhesive containing an epoxy compound having two or more epoxy groups, and an amine compound having two or more amino groups, an adhesive kit, and a method of using a reaction-curable adhesive.

2. Description of the Related Art

A reaction-curable adhesive of such a type as to be cured by causing a component in a main agent and a component in a curing agent to react with each other has heretofore been known as an adhesive. The reaction-curable adhesive has been put on the market in the form of an adhesive kit in which the main agent and the curing agent are sealed in different containers. That is, the main agent and the curing agent included in the adhesive kit are mixed to exhibit reactivity, and serve as components forming the reaction-curable adhesive. The reaction-curable adhesive has been widely utilized for the purpose of bonding various members to each other, and in Japanese Patent Application Laid-open No. 2010-127426, there is a description that the metal pipes of the heat exchanger of an air conditioner, a refrigerator, or the like are bonded to each other with the reaction-curable adhesive.

Incidentally, in a freezing/refrigerating warehouse or the like, various apparatus are placed under a below-freezing environment. In addition, some constituent parts of a measuring instrument or a medical instrument have heretofore been used under an environment having a temperature much lower than that of an environment in a general freezer, and parts, such as the energy dispersive X-ray (EDX) detector of a transmission electron microscope, and the superconducting magnet of an NMR or MRI apparatus, are used after having been cooled with liquid nitrogen or the like. Further, in recent years, an investigation toward the practical application of a superconducting coil has been widely performed, and hence the number of opportunities for instruments to be used under extremely low temperatures has been increasing.

A general adhesive may not sufficiently function under an extremely low temperature condition. For example, members bonded to each other with a related-art reaction-curable adhesive show a sufficient adhesive strength at normal temperature. However, when the members are cooled to a temperature at the level of liquid nitrogen, bonded portions may be detached from each other owing to slight impact. Accordingly, it is difficult to apply a general adhesive of the related art to a member to be used under such low-temperature environment as described in the foregoing. In view of the foregoing, a reaction-curable adhesive that exhibits an excellent adhesive strength even under a low-temperature environment has heretofore been demanded, but a reaction-curable adhesive that satisfies such demand has not been provided yet. The present invention has been made to satisfy the demand, and an object of the present invention is to provide a reaction-curable adhesive and an adhesive kit each of which exhibits an excellent adhesive strength even under a low-temperature environment.

SUMMARY OF THE INVENTION

The inventors of the present invention have made extensive investigations for achieving the object, and as a result, have found that the demand can be satisfied by using, in a reaction-curable adhesive of such a type that an epoxy compound and an amine compound are caused to react with each other, a compound having a specific molecular structure as at least one of the epoxy compound or the amine compound. Thus, the inventors have completed the present invention.

That is, in order to achieve the object, according to one aspect of the present invention, there is provided a reaction-curable adhesive, including: an epoxy compound having two or more epoxy groups; and an amine compound having two or more amino groups, the reaction-curable adhesive being cured through a reaction between the epoxy compound and the amine compound, in which a main chain of at least one of the epoxy compound or the amine compound has a structure represented by a general formula (1) below.

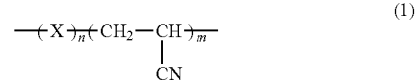

(1)

In the formula, "X" represents a divalent organic group having one or two unsaturated bonds, the divalent organic group being obtained by removing two hydrogen atoms from an unsaturated hydrocarbon having 3 to 10 carbon atoms, and "n" represents an integer of 1 or more and 100 or less, and "m" represents an integer of 1 or more and 100 or less.

According to another aspect of the present invention, there is provided an adhesive kit of a reaction-curable adhesive, including: a main agent; and a curing agent, in which: the main agent contains an epoxy compound having two or more epoxy groups; the curing agent contains an amine compound having two or more amino groups; a main chain of at least one of the epoxy compound or the amine compound has a structure represented by a general formula (1) below; and the reaction-curable adhesive is cured through a reaction between the epoxy compound and the amine compound.

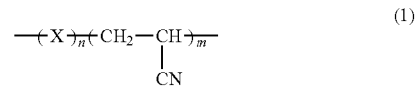

(1)

In the formula, "X" represents a divalent organic group having one or two unsaturated bonds, the divalent organic group being obtained by removing two hydrogen atoms from an unsaturated hydrocarbon having 3 to 10 carbon atoms, and "n" represents an integer of 1 or more and 100 or less, and "m" represents an integer of 1 or more and 100 or less.

According to still another aspect of the present invention, there is provided a method of using a reaction-curable adhesive containing an epoxy compound having two or more epoxy groups, and an amine compound having two or more amino groups, the reaction-curable adhesive being cured through a reaction between the epoxy compound and the amine compound, a main chain of at least one of the epoxy compound or the amine compound having a structure represented by a general formula (1) below, the method including: mixing the compounds of the reaction-curable adhesive with a static mixer; and applying the reaction-curable adhesive in which the compounds have been mixed with a dispenser.

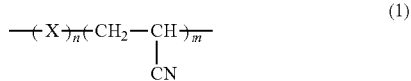
(1)

In the formula, "X" represents a divalent organic group having one or two unsaturated bonds, the divalent organic group being obtained by removing two hydrogen atoms from an unsaturated hydrocarbon having 3 to 10 carbon atoms, and "n" represents an integer of 1 or more and 100 or less, and "m" represents an integer of 1 or more and 100 or less.

According to the present invention, the reaction-curable adhesive that exhibits an excellent adhesive strength even under a low-temperature environment can be provided.

DESCRIPTION OF THE EMBODIMENTS

One embodiment of the present invention is described below by taking a case in which a reaction-curable adhesive is utilized in a linked member including two members as an example.

The reaction-curable adhesive in this embodiment is brought into a solid state by a curing reaction, and is in a liquid state at normal temperature (23° C.) before the reaction. The term "liquid state" is not used in a narrow meaning, but is used in a wide meaning including even a state referred to as, for example, so-called "paste state".

Figure 1:
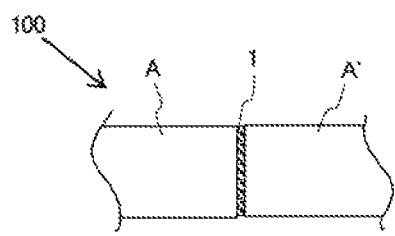
FIG. 1 is a schematic view for showing a state in which a reaction-curable adhesive is used in the bonding of members.

As shown in FIG. 1, the reaction-curable adhesive in this embodiment is used in the bonding of one member A and another member A', and is used for forming an adhesive layer 1 between the members. In a linked member 100 obtained by bonding the two members to each other, an excellent strength is exhibited in the adhesive layer 1 even under a low-temperature environment. For such reason, the reaction-curable adhesive in this embodiment is preferably used in the formation of the adhesive layer 1 of the linked member 100 to be utilized at temperatures lower than −100° C. The reaction-curable adhesive is more preferably used in the formation of the adhesive layer 1 of the linked member 100 to be utilized at temperatures lower than −150° C., and is particularly preferably used in the formation of the adhesive layer 1 of the linked member 100 to be utilized at temperatures lower than −196° C.

However, the temperature at which the linked member 100 is used is preferably −270° C. or more.

The reaction-curable adhesive of this embodiment to be used in the bonding of such members (A and A') as described above is a reaction-curable adhesive containing an epoxy compound having two or more epoxy groups, and an amine compound having two or more amino groups, the reaction-curable adhesive being cured through a reaction between the epoxy compound and the amine compound.

The reaction-curable adhesive of this embodiment is utilized in the form of an adhesive kit. That is, an adhesive kit of this embodiment is an adhesive kit of a reaction-curable adhesive including a main agent and a curing agent that are mixed to exhibit reactivity. In the adhesive kit, the main agent and the curing agent are sealed in different containers. The main agent in the adhesive kit contains an epoxy compound having two or more epoxy groups. The curing agent in the adhesive kit contains an amine compound having two or more amino groups.

The reaction-curable adhesive of this embodiment is of a two-pack curing type to be used by mixing a liquid main agent containing the epoxy compound (hereinafter sometimes referred to as "first liquid") and a liquid curing agent containing the amine compound (hereinafter sometimes referred to as "second liquid"). In the reaction-curable adhesive of this embodiment, the first liquid and the second liquid are preferably distinguished by color so that their mixed state can be easily seen. More specifically, the colors of the first liquid and the second liquid are preferably made different from each other. For example, when the color of the first liquid is set to any one of Munsell's 10 basic colors specified in JIS Z8721 or the like (R: red, YR: yellow red, Y: yellow, GY: green yellow, G: green, BG: blue green, B: blue, PB: purple blue, P: purple, and RP: red purple), the second liquid is preferably colored so as to have a color different from the foregoing. In particular, the colors of the first liquid and the second liquid are preferably set to colors distant from each other by two or more segments in Munsell's hue circle, and are more preferably set to colors distant from each other by three or more segments. For example, when the color of the first liquid is set to a color belonging to "G: green", the color of the second liquid is preferably a color other than the three colors, i.e., "GY: green yellow", "G: green", and "BG: blue green", and is more preferably a color other than the five colors, i.e., "Y: yellow", "GY: green yellow", "G: green", "BG: blue green", and "B: blue".

The first liquid and the second liquid preferably have as low viscosities as possible in order to exhibit satisfactory mixability. A diluent may be incorporated into each of the first liquid and the second liquid for diluting the epoxy compound or the amine compound to reduce the viscosity of the liquid. However, each of the first liquid and the second liquid preferably includes a raw material that does not cause any residual solvent in the adhesive layer 1, is preferably free of any organic solvent, and is preferably of a solventless type. Therefore, when a diluent is incorporated, it is preferred that not an organic solvent but a reactive diluent be used as the diluent, and be introduced into a polymer forming a cured product at the time of a curing reaction caused by the first liquid and the second liquid.

Examples of the reactive diluent include: alkyl monoglycidyl ethers, such as butyl glycidyl ether and 2-ethylhexyl glycidyl ether; alkyl phenol monoglycidyl ethers; and polyglycidyl ethers, such as 1,6-hexanediol diglycidyl ether.

When the viscosity of the reaction-curable adhesive produced by mixing the first liquid and the second liquid is excessively low, the adhesive may flow out of a site requiring the adhesive to a site not requiring the adhesive. Therefore, the fluidity of the reaction-curable adhesive is preferably suppressed to some extent.

For such reason, an inorganic filler or the like may be incorporated into the first liquid or the second liquid as required. The inorganic filler is preferably selected from materials other than conductive fillers (e.g., metal powder and carbon black) and magnetic fillers (e.g., ferrite powder) in order that constraints may be prevented from being added to the applications of the reaction-curable adhesive. The material for the inorganic filler is preferably one or more kinds selected from the group consisting of, for example, aluminum oxide (alumina), silicon oxide (silica), zinc oxide, titanium oxide, aluminum nitride, silicon nitride, boron nitride, silicon carbide, calcium carbonate, magnesium carbonate, sodium carbonate, sodium silicate, magnesium silicate, calcium silicate, and potassium aluminum silicate.

When particles of a silicic acid compound are used as the inorganic filler, particles of one or more clay minerals selected from the group consisting of, for example, montmorillonite, smectite, bentonite, mica, and sericite may be used as the inorganic filler.

The particles of any such clay mineral as described above have plate-like particle shapes, and hence are effective in imparting an excellent strength to a cured product obtained by curing the reaction-curable adhesive. In addition, the reaction-curable adhesive preferably has pseudoplasticity in a state before its curing from the viewpoints of, for example, satisfactory mixability of the first liquid and the second liquid, satisfactory spreadability of the adhesive after their mixing, and the prevention of the dripping of the adhesive from members to be bonded to each other. In order that the reaction-curable adhesive may be caused to exhibit pseudoplasticity, bentonite particles may be incorporated into the reaction-curable adhesive, or organobentonite particles may be incorporated thereinto. The organobentonite particles are preferably such particles that ions between their layers are substituted with alkyl quaternary ammonium ions. The average particle diameter (median diameter (D50) on a volume basis after delamination) of the organobentonite particles measured on the basis of a laser diffraction/scattering method is preferably 0.1 µm or more and 100 µm or less.

In order that the reaction-curable adhesive before its curing may be caused to exhibit moderate viscosity, fumed silica may be incorporated into the reaction-curable adhesive. The fumed silica preferably has an average particle diameter of 5 nm or more and 30 nm or less. The average particle diameter of the fumed silica is determined on the basis of the results of the observation of its particles with a transmission electron microscope (TEM). That is, the contour shapes of the individual particles are observed with the TEM, and the areas of the contour shapes are determined, followed by the determination of the diameters of circles having the same areas as the determined areas. The average of the diameters may be determined as the average particle diameter of the fumed silica.

In order that the cured product of the reaction-curable adhesive may be caused to exhibit excellent low-temperature embrittlement resistance, calcium silicate particles may be incorporated into the reaction-curable adhesive. Of calcium metasilicate particles, calcium orthosilicate particles, and tricalcium silicate particles, the calcium metasilicate particles are suitable as the calcium silicate particles to be incorporated into the reaction-curable adhesive. The calcium metasilicate particles have needle-shaped structures, and hence are suitable for improving a strength in the cured product of the reaction-curable adhesive. The average particle diameter (median diameter (D50) on a volume basis) of the calcium silicate particles, such as the calcium metasilicate particles, measured on the basis of the laser diffraction/scattering method is preferably 0.5 µm or more and 100 µm or less.

Calcium carbonate particles may be further incorporated into the reaction-curable adhesive of this embodiment for the purpose of, for example, adjusting its viscosity. The average particle diameter (median diameter (D50) on a volume basis)) of the calcium carbonate particles measured on the basis of the laser diffraction/scattering method is preferably 5 µm or more and 50 µm or less.

The inorganic filler may be incorporated into the first liquid, may be incorporated into the second liquid, or may be incorporated into both the first liquid and the second liquid in portions. The inorganic filler is preferably incorporated so that its mass ratio in the cured product of the reaction-curable adhesive may be 25 mass % or more and 75 mass % or less, and is more preferably incorporated so that the mass ratio may be 30 mass % or more and 70 mass % or less.

The organobentonite particles are preferably incorporated so that their mass ratio in the cured product of the reaction-curable adhesive may be 3 mass % or more and 15 mass % or less, and are more preferably incorporated so that the mass ratio may be 5 mass % or more and 10 mass % or less. The fumed silica is preferably incorporated so that its mass ratio in the cured product of the reaction-curable adhesive may be 0.5 mass % or more and 5 mass % or less, and is more preferably incorporated so that the mass ratio may be 1 mass % or more and 3 mass % or less. The calcium silicate particles are preferably incorporated so that their mass ratio in the cured product of the reaction-curable adhesive may be 10 mass % or more and 50 mass % or less, and are more preferably incorporated so that the mass ratio may be 15 mass % or more and 45 mass % or less. The calcium carbonate particles are preferably incorporated so that their mass ratio in the cured product of the reaction-curable adhesive may be 3 mass % or more and 15 mass % or less, and are more preferably incorporated so that the mass ratio may be 5 mass % or more and 10 mass % or less.

In this embodiment, it is important that a compound having a structure represented by a general formula (1) below on its main chain be incorporated into one, or each of both, of the epoxy compound and the amine compound. That is, the reaction-curable adhesive of this embodiment contains a chain polymer compound having epoxy groups or amino groups at its terminals, and having a molecular structure represented by a general formula (1) below.

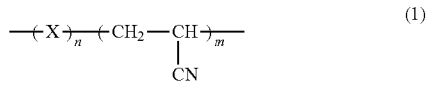

In the formula, "X" represents a divalent organic group having one or two unsaturated bonds, the divalent organic group being obtained by removing two hydrogen atoms from an unsaturated hydrocarbon having 3 to 10 carbon atoms. In addition, "n" represents an integer of 1 or more and 100 or less, and "m" represents an integer of 1 or more and 100 or less.

In the formula, "X" represents, for example, a propene-1,1-diyl group, a propene-1,2-diyl group, a propene-1,3-diyl group, a but-1-ene-1,4-diyl group, a but-1-ene-1,3-diyl group, a but-2-ene-1,4-diyl group, a buta-1,3-diene-1,4-diyl group, a pent-2-ene-1,5-diyl group, a hex-3-ene-1,6-diyl group, a hexa-2,4-diene-1,6-diyl group, a hept-3-ene-1,7-diyl group, a hepta-2,5-diene-1,7-diyl group, a 2,5-dimethylpent-3-ene-1,5-diyl group, an oct-3-ene-1,8-diyl group, a non-3-ene-1,9-diyl group, a dec-3-ene-1,10-diyl group, and a 5-ethyl-2-methylhept-3-ene-1,7-diyl group. In the formula, "X" preferably represents a but-1-ene-1,4-diyl group. That is, the chain polymer compound having a molecular structure represented by the general formula (1) is preferably a copolymer of butadiene and acrylonitrile.

The reaction-curable adhesive of this embodiment may be such an adhesive that part or the entirety of the epoxy compound has a molecular structure represented by the general formula (1), or may be such an adhesive that part or the entirety of the amine compound has a molecular structure represented by the general formula (1). The compound having a molecular structure represented by the general formula (1) may be only the epoxy compound, may be only the amine compound, or may be each of both the epoxy compound and the amine compound. Numbers of repetitions (n and m) in the general formula (1) are each preferably 5 or more, more preferably 10 or more. The numbers of repetitions (n and m) in the general formula (1) are each preferably 90 or less, more preferably 80 or less.

When the compound having a molecular structure represented by the general formula (1) is the epoxy compound, another organic group or heteroatom may be interposed between the main chain represented by the general formula (1) and a terminal epoxy group. Similarly, when the compound having a molecular structure represented by the general formula (1) is the amine compound, another organic group or heteroatom may be interposed between the main chain represented by the general formula (1) and a terminal amino group. Examples of the organic group that may be interposed between the main chain and a terminal epoxy group or amino group (such groups are hereinafter sometimes collectively referred to as "terminal groups") include an alkylene group, a cycloalkylene group, and an arylene group. In those organic groups, one or more hydrogen atoms may be substituted with a substituent. Examples of the alkylene group include a methylene group, an ethylene group, a propylene group, a butylene group, a pentylene group, a hexylene group, a heptylene group, and an octylene group.

Examples of the cycloalkylene group include a cyclopropylene group, a cyclobutylene group, a cyclopentylene group, and a cyclohexylene group. Examples of the arylene group include a phenylene group and a naphthylene group. Examples of the heteroatom include an oxygen atom, a nitrogen atom, a sulfur atom, and a phosphorus atom. The organic group or the heteroatom interposed between the main chain represented by the general formula (1) and one terminal group, and the organic group or the heteroatom interposed between the main chain and the other terminal group may be identical to or different from each other. The total number of atoms of the organic group or the heteroatom interposed between the main chain represented by the general formula (1) and each of both the terminal groups is preferably 15 or less, more preferably 10 or less.

The reaction-curable adhesive of this embodiment preferably contains the compound having a structure represented by the general formula (1) on its main chain as part of the amine compound. In addition, a compound generally referred to as, for example, "epoxy resin" is preferably adopted as the epoxy compound serving as the main component of the first liquid. The epoxy resin is preferably, for example, a bisphenol-type epoxy resin, such as a bisphenol A-type epoxy resin or a bisphenol F-type epoxy resin. Of those, an epoxy resin that is liquid at normal temperature (23° C.) is preferred as the epoxy compound to be incorporated into the first liquid. Therefore, a bisphenol-type epoxy resin free of any repeating structure is preferred as the epoxy resin. Specifically, the epoxy resin serving as a main component of the first liquid is preferably, for example, bis[4-(glycidyloxy)phenyl]methane (a bisphenol F-type epoxy resin) or bis[4-(glycidyloxy)phenyl]propane (a bisphenol A-type epoxy resin).

The first liquid preferably contains bis[4-(glycidyloxy)phenyl]methane or bis[4-(glycidyloxy)phenyl]propane at a ratio of 80 mass % or more. The total content of bis[4-(glycidyloxy)phenyl]methane and bis[4-(glycidyloxy)phenyl]propane in the first liquid is more preferably 90 mass % or more, still more preferably 95 mass % or more. It is particularly preferred that the first liquid be formed only of bis[4-(glycidyloxy)phenyl]methane or bis[4-(glycidyloxy)phenyl]propane.

Meanwhile, the second liquid preferably contains the amine compound having a structure represented by the general formula (1) as its main component. The amine compound having a structure represented by the general formula (1) functions as a curing agent for the epoxy compound of the first liquid. However, it is not easy to make both the reactivity of the reaction-curable adhesive and the physical properties of the cured product sufficiently satisfactory with the amine compound having a structure represented by the general formula (1) alone. Accordingly, the second liquid preferably contains another amine compound.

Here, the amine compound having a structure represented by the general formula (1) is, for example, an amine-terminated butadiene-acrylonitrile copolymer (ATBN).

The number-average molecular weight of the amine-terminated butadiene-acrylonitrile copolymer (ATBN) is preferably 1,000 or more and 7,000 or less. The number-average molecular weight of the amine-terminated butadiene-acrylonitrile copolymer (ATBN) is more preferably 2,000 or more and 6,000 or less.

Here, the number-average molecular weight (Mn) is a value determined by gel permeation chromatography (GPC), and is a polystyrene-equivalent value measured by using tetrahydrofuran (THF) as a solvent at 40° C.

The amine equivalent (amine hydrogen equivalent weight) of the amine-terminated butadiene-acrylonitrile copolymer (ATBN) is preferably 500 g/eq or more and 1,500 g/eq or less. The amine equivalent of the amine-terminated butadiene-acrylonitrile copolymer (ATBN) is more preferably 600 g/eq or more and 1,400 g/eq or less.

The acrylonitrile content of the amine-terminated butadiene-acrylonitrile copolymer (ATBN) is preferably 10 mass % or more and 30 mass % or less. The acrylonitrile content of the amine-terminated butadiene-acrylonitrile copolymer (ATBN) is more preferably 12 mass % or more and 25 mass % or less.

As described in the foregoing, the reaction-curable adhesive of this embodiment preferably contains two or more kinds of compounds including the amine-terminated butadiene-acrylonitrile copolymer (ATBN) as amine compounds, and more preferably contains three or more kinds of amine compounds. That is, the reaction-curable adhesive of this embodiment preferably contains two or more kinds of the amine compounds including a first amine compound and a second amine compound, and more preferably contains the first amine compound, the second amine compound, and a third amine compound. It is preferred that the reaction-curable adhesive of this embodiment contain the amine-terminated butadiene-acrylonitrile copolymer (ATBN) as the first amine compound, and contain polyfunctional amine compounds as the second amine compound and the third amine compound.

The reaction-curable adhesive of this embodiment preferably contains a polyfunctional amine compound that is trifunctional or more as an amine compound other than the amine-terminated butadiene-acrylonitrile copolymer (ATBN). Examples of the polyfunctional amine compound that is trifunctional or more include trimethylolpropane poly(oxypropylene)triamine, diethylenetriamine, triethylenetetramine, and tetraethylenepentamine. In addition, the reaction-curable adhesive of this embodiment preferably contains a Mannich-modified polyamine compound as an amine compound other than the amine-terminated butadiene-acrylonitrile copolymer (ATBN).

The amine-terminated butadiene-acrylonitrile copolymer (ATBN) is effective in imparting toughness to the cured product of the reaction-curable adhesive, and is effective in causing the adhesive to exhibit an excellent adhesive strength under a low-temperature environment. Meanwhile, an amine compound other than the amine-terminated butadiene-acrylonitrile copolymer (ATBN) is effective in adjusting a curing reaction rate, and is effective in making workability at the time of the bonding of the members (A and A') with the reaction-curable adhesive satisfactory. In order that the reaction-curable adhesive may be caused to exhibit excellent curability at normal temperature (23° C.), an amine compound other than the amine-terminated butadiene-acrylonitrile copolymer (ATBN) is preferably a bulky compound having a branched structure. In addition, for example, a compound obtained by using a compound having active hydrogen, such as a phenol compound, a polyamine compound, such as isophoronediamine or xylylenediamine, and a formaldehyde as starting materials is preferably adopted as the Mannich-modified polyamine compound.

Specifically, the reaction-curable adhesive of this embodiment preferably contains the following three kinds of compounds as the amine compounds: the amine-terminated butadiene-acrylonitrile copolymer (ATBN) (first amine compound), trimethylolpropane poly(oxypropylene)triamine (second amine compound), and the Mannich-modified polyamine compound (third amine compound).

When the total amount of the epoxy compound and the amine compound is defined as 100 mass %, the ratio of the epoxy compound is preferably 20 mass % or more and 80 mass % or less, more preferably 30 mass % or more and 70 mass % or less. Therefore, the ratio of the amine compound is also preferably 20 mass % or more and 80 mass % or less, more preferably 30 mass % or more and 70 mass % or less.

In the case where a plurality of amine compounds including the amine-terminated butadiene-acrylonitrile copolymer (ATBN) are incorporated into the reaction-curable adhesive, when the total content of the amine compounds is defined as 100 mass %, the ratio of the amine-terminated butadiene-acrylonitrile copolymer (ATBN) is preferably 20 mass % or more and 60 mass % or less, more preferably 25 mass % or more and 55 mass % or less.

In the case where the trimethylolpropane poly(oxypropylene)triamine and the Mannich-modified polyamine compound are incorporated as amine compounds in addition to the amine-terminated butadiene-acrylonitrile copolymer (ATBN), when the total content of the amine compounds is defined as 100 mass %, the ratio of the trimethylolpropane poly(oxypropylene)triamine is preferably 30 mass % or more and 60 mass % or less, more preferably 35 mass % or more and 55 mass % or less. In addition, the ratio of the Mannich-modified polyamine compound is preferably 5 mass % or more and 17 mass % or less, more preferably 7 mass % or more and 15 mass % or less.

Various additives, such as a pigment, may be further incorporated into the first liquid and the second liquid in this embodiment for causing the liquids to exhibit such color tones as described in the foregoing.

At the time of the use of the reaction-curable adhesive of this embodiment, the first liquid serving as the main agent and the second liquid serving as the curing agent are preferably brought into a more uniform mixed state. A method of using the reaction-curable adhesive of this embodiment preferably includes: mixing the first and second liquids of the reaction-curable adhesive with a static mixer; and applying the reaction-curable adhesive in which the liquids have been mixed to one, or each of both, of the two members forming the linked member with a dispenser. A general mixer having a pipe portion through which the first liquid and the second liquid flow in a mixed state, the pipe portion including a pipe main body and a stirring member (e.g., a baffle board or a rotary blade) arranged in the pipe main body, may be used as the static mixer. The static mixer is preferably such a mixer that the pipe portion is replaceable. The use of such static mixer has an advantage in that the waste of the reaction-curable adhesive hardly occurs because of the following reasons: uniform mixing of the first liquid and the second liquid can be performed merely by passing the liquids through the pipe portion without any need for special power for stirring; and the timing at which the first liquid and the second liquid are mixed can be set to a timing immediately before the use of the reaction-curable adhesive.

The reaction-curable adhesive of this embodiment is brought into such a state as to have reactivity by mixing the first liquid and the second liquid. However, its state before the mixing is not limited to the two liquids, and the adhesive may be divided into three or more liquids. The reaction-curable adhesive of this embodiment exhibits an excellent adhesive force even after its long-term storage because the adhesive is utilized as an adhesive kit in which the main agent and the curing agent are separately included, and are sealed in different containers. In addition, when the reaction-curable adhesive is used in the form of the adhesive kit, a method of combining the main agent and the curing agent is not limited to a method involving combining one main agent with one curing agent. One main agent may be combined with one curing agent and another curing agent. In contrast, one curing agent may be combined with one main agent and another main agent. In addition, in the case where an adhesive kit in which at least one of its main agent or curing agent comes in a plurality of kinds is used as the adhesive kit as described above, when the main agent or the curing agent that comes in a plurality of kinds is distinguished by color as described in the foregoing, a situation in which the main agent and the curing agent are combined can be identified by color, and hence the wrong use of the kit can be prevented. Further, the storage state of the reaction-curable adhesive of this embodiment before its curing does not need to be a state divided into two or more liquids, and the adhesive may be stored in the state of one liquid by incorporating a compound for blocking a reactive functional group.

The reaction-curable adhesive of this embodiment may adopt a conventionally known technical matter in addition to the matters given above as examples to the extent that the effects of the present invention are not significantly impaired. That is, the present invention is by no means limited to the above-mentioned examples.

EXAMPLES

Next, the present invention is more specifically described by way of Examples, but the present invention is not limited thereto.

(Used Materials)

A reaction-curable adhesive was produced by using such materials as described below, and the evaluation of its adhesive property at low temperature was performed.

Epoxy Compound 1:

bisphenol F-type epoxy resin that is liquid at normal temperature (23° C.) (bis[4-(glycidyloxy)phenyl]methane), epoxy equivalent: 160 g/eq to 170 g/eq Amine Compound 1:

amine-terminated butadiene-acrylonitrile copolymer, amine equivalent: 900 g/eq, number-average molecular weight: 3,800

Amine Compound 2:

Mannich-modified polyamine compound, active hydrogen equivalent: 75 g/eq

Amine Compound 3:

trimethylolpropane poly(oxypropylene)triamine, amine equivalent: 81 g/eq

Example 1

A first liquid (main agent) and a second liquid (curing agent) were prepared according to contents shown in Table 1 below. That is, the first liquid containing the epoxy compound 1 and the second liquid containing the amine compounds 1 to 3 were prepared. The first liquid was prepared so as to show a blue color with a colorant, and the second liquid was prepared so as to show a yellow color with a colorant, though a detailed description of such colorants is omitted here. The first liquid and the second liquid were able to be easily mixed by hand mixing with a spatula or the like on a beaker scale, and their mixed state was able to be easily seen by their color tones. In the following Table 1, the values of the "Mass %" are calculated from the values of the "Parts by mass".

TABLE 1

| | Blending agent | Parts by mass | Mass % | (mass %) |
|---|---|---|---|---|
| First liquid | Epoxy compound 1 | 100 | 52.6 | — |
| Second liquid | Amine compound 1 | 40 | 21.1 | (44.4) |
| | Amine compound 2 | 10 | 5.3 | (11.1) |
| | Amine compound 3 | 40 | 21.1 | (44.4) |
| | Total | 190 | 100.0 | |

*A numerical value in parenthesis on the right end of the table represents a mass ratio in the second liquid.

Example 2

A first liquid and a second liquid were prepared in the same manner as in Example 1 except that inorganic fillers were incorporated into the second liquid as shown in Table 2 below.

TABLE 2

| | Blending agent | Parts by mass | Mass % |
|---|---|---|---|
| First liquid | Epoxy compound 1 | 100 | 29.8 |
| Second liquid | Amine compound 1 | 40 | 11.9 |
| | Amine compound 2 | 10 | 3.0 |
| | Amine compound 3 | 40 | 11.9 |
| | Subtotal | 190 | 56.5 |
| | Organobentonite particles | 20 | 6.0 |
| | Calcium carbonate particles | 20 | 6.0 |
| | Calcium metasilicate particles | 100 | 29.8 |
| | Fumed silica | 6 | 1.8 |
| | Subtotal | 146 | 43.5 |
| | Total | 336 | 100.0 |

As in those prepared in Example 1, the first liquid and the second liquid in Example 2 were able to be easily mixed, and their mixed state was able to be easily seen.

Example 3

A first liquid and a second liquid were prepared in the same manner as in Example 1 except that the amount of the epoxy compound to be prepared was reduced to one half of that described above as shown in Table 3 below.

TABLE 3

| | Blending agent | Parts by mass | Mass % |
|---|---|---|---|
| First liquid | Epoxy compound 1 | 50 | 35.7 |
| Second liquid | Amine compound 1 | 40 | 28.6 |
| | Amine compound 2 | 10 | 7.1 |
| | Amine compound 3 | 40 | 28.6 |
| | Total | 140 | 100.0 |

As in those prepared in Example 1 and Example 2, the first liquid and the second liquid in Example 3 were able to be easily mixed, and their mixed state was able to be easily seen.

Example 4

A first liquid and a second liquid were prepared in the same manner as in Example 1 except that only the amine compound 1 was incorporated into the second liquid.

Comparative Example 1

A first liquid and a second liquid were prepared in the same manner as in Example 1 except that the second liquid was prepared so as to be free of the amine compound 1.

<Evaluation>

Figure 2A:
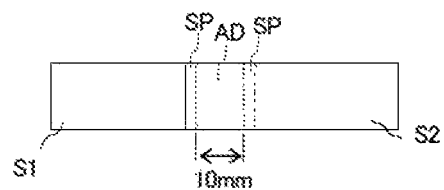
FIG. 2A is a schematic plan view for showing the shape of a sample for measuring a shear adhesive force and FIG. 2B is a schematic front view for showing the shape.
Figure 2B:

Two strip-shaped metal pieces S1 and S2 were prepared as shown in FIG. 2A and FIG. 2B. Cold-rolled steel plates (SPCC-S JIS K3141, manufactured by Taiyu Kizai Co., Ltd., size: 100 mm×15 mm×1.0 mm) were used as the metal pieces S1 and S2. A fluorine resin tape having a thickness of 80 μm was bonded as a spacer SP to one end portion in its lengthwise direction of the one strip-shaped metal piece S1 (hereinafter sometimes referred to as "first metal piece S1") out of the two strip-shaped metal pieces S1 and S2. A fluorine resin tape was separately bonded as the spacer SP to a position distant from the above-mentioned fluorine resin tape by 10 mm toward the other end side of the first metal piece S1. That is, a region measuring 15 mm by 10 mm was defined in the one end portion of the first metal piece S1 with the two fluorine resin tapes (spacers SP each having a thickness of 80 μm). Next, the first liquid and the second liquid produced in each of Examples and Comparative Example were sufficiently mixed at a predetermined ratio to prepare a reaction-curable adhesive, and the adhesive was applied to the region. The other strip-shaped metal piece S2 (hereinafter sometimes referred to as "second metal piece S2") was superimposed on the first metal piece S1 having applied thereto the reaction-curable adhesive, and the first metal piece S1 and the second metal piece S2 were bonded to each other with the reaction-curable adhesive. At this time, the two strip-shaped metal pieces S1 and S2 were bonded to each other so as to be in a state in which the metal pieces underwent a positional shift from each other in their lengthwise directions as shown in FIG. 2A and FIG. 2B, and were bonded to each other so that their end portions overlapped each other across the region having applied thereto the adhesive. Then, the reaction-curable adhesive was cured by leaving the sites superimposed on each other to stand at room temperature for 24 hours while pressurizing the sites at a pressure of 2.0 MPa. Thus, an evaluation sample was produced. The adhesive force (breaking force) of the evaluation sample at 25° C. was measured in conformity with the "Adhesives-Determination of tensile lap-shear strength of rigid-to-rigid bonded assemblies" of JIS K6850:1999. In addition, the elastic moduli of a cured product of the reaction-curable adhesive at 25° C. and −196° C. were measured, and the adhesive force (breaking force) of the evaluation sample at −196° C. was determined from the obtained results by calculation. The measurement of the adhesive force was performed while "the number N of the measurement was set to 5." The obtained results are shown in Table 4 below. Here, an observed value for the adhesive force of the reaction-curable adhesive of Example 4 at 25° C. was only about 65% of that of Example 1 because its curing was considered to be insufficient under the curing conditions of room temperature and 24 hours. In addition, in Example 4, the calculation of the adhesive force at −196° C. was not performed because the curing was considered to be insufficient.

TABLE 4

| Measurement temperature | | Shear adhesive force (N) | | | | |
|---|---|---|---|---|---|---|
| | | Example 1 | Example 2 | Example 3 | Example 4 | Comparative Example 1 |
| 25° C. | #1 | 3,267 | 2,658 | 2,777 | 1,719 | 2,129 |
| | #2 | 2,574 | 3,085 | 2,976 | 1,785 | 1,694 |
| | #3 | 2,868 | 3,270 | 2,179 | 1,631 | 3,152 |
| | #4 | 2,252 | 2,017 | 2,520 | 1,397 | 3,476 |
| | #5 | 2,043 | 2,428 | 2,253 | 1,951 | 2,840 |
| | Average | 2,601 | 2,692 | 2,541 | 1,697 | 2,658 |
| −196° C. | #1 | 3,270 | 3,788 | 3,630 | — | 250 |
| | #2 | 3,308 | 3,279 | 3,697 | — | 180 |
| | #3 | 3,470 | 3,541 | 3,398 | — | 100 |
| | #4 | 3,043 | 3,520 | 3,576 | — | 95 |
| | #5 | 3,428 | 3,840 | 3,636 | — | 110 |
| | Average | 3,304 | 3,594 | 3,587 | — | 147 |

As can be seen from the foregoing results, according to the present invention, there is obtained a reaction-curable adhesive that exhibits an excellent adhesive strength even under a low-temperature environment.

What is claimed is:

1. A reaction-curable adhesive, comprising:
an epoxy compound having two or more epoxy groups; and
an amine compound having two or more amino groups,
the reaction-curable adhesive being cured through a reaction between the epoxy compound and the amine compound,
wherein the reaction-curable adhesive comprises, as the amine compound, a polyfunctional amine compound that is trifunctional or more, a Mannich-modified polyamine compound obtained by using a polyamine as a starting material, and an amine-terminated butadiene-acrylonitrile copolymer (ATBN) having a structure represented by general formula (1) below,
wherein the reaction-curable adhesive comprises bis[4-(glycidyloxy)phenyl]methane as the epoxy compound, and
wherein the polyamine as the starting material comprises at least one polyamine selected from the group consisting of isophoronediamine and xylylenediamine:

(1)

where "X" represents at least one of a but-1-ene-1,4-diyl group and a but-2-ene-1,4-diyl group, and "n" represents an integer of 1 or more and 100 or less, and "m" represents an integer of 1 or more and 100 or less.

2. A reaction-curable adhesive according to claim 1, further comprising an inorganic filler.

3. An adhesive kit of a reaction-curable adhesive, comprising:
a main agent; and
a curing agent,
wherein:
the main agent contains an epoxy compound having two or more epoxy groups;
the curing agent contains an amine compound having two or more amino groups;
the main agent comprises bis[4-(glycidyloxy)phenyl]methane as the epoxy compound;
the curing agent comprises, as the amine compound, a polyfunctional amine compound that is trifunctional or more, a Mannich-modified polyamine compound obtained by using a polyamine as a starting material, and an amine-terminated butadiene-acrylonitrile copolymer (ATBN) having a structure represented by general formula (1) below,
wherein the polyamine as the starting material comprises at least one polyamine selected from the group consisting of isophoronediamine and xylylenediamine; and
the reaction-curable adhesive is cured through a reaction between the epoxy compound and the amine compound:

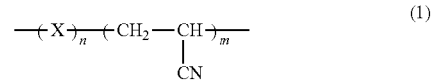
(1)

where "X" represents at least one of a but-1-ene-1,4-diyl group and a but-2-ene-1,4-diyl group, and "n" represents an integer of 1 or more and 100 or less, and "m" represents an integer of 1 or more and 100 or less.

4. A method of using a reaction-curable adhesive containing an epoxy compound having two or more epoxy groups, and an amine compound having two or more amino groups, the reaction-curable adhesive being cured through a reaction between the epoxy compound and the amine compound, the reaction-curable adhesive comprising, as the amine compound, a polyfunctional amine compound that is trifunctional or more, a Mannich-modified polyamine compound obtained by using a polyamine as a starting material, and an amine-terminated butadiene-acrylonitrile copolymer (ATBN) having a structure represented by general formula (1) below, and comprising bis[4-(glycidyloxy)phenyl]methane as the epoxy compound; wherein the polyamine as the starting material comprises at least one polyamine selected from the group consisting of isophoronediamine and xylylenediamine, the method comprising:
mixing the compounds of the reaction-curable adhesive with a static mixer; and
applying the reaction-curable adhesive in which the compounds have been mixed with a dispenser:

(1)

where "X" represents at least one of a but-1-ene-1,4-diyl group and a but-2-ene-1,4-diyl group, and "n" represents an integer of 1 or more and 100 or less, and "m" represents an integer of 1 or more and 100 or less.

5. The method of using a reaction-curable adhesive according to claim 4, wherein the reaction-curable adhesive is used in bonding members to be utilized at temperatures lower than −100° C.

* * * * *